(12) United States Patent
Reddy et al.

(10) Patent No.: US 8,053,395 B2
(45) Date of Patent: Nov. 8, 2011

(54) COMPOSITIONS FOR INCREASING GAS PRODUCTION FROM A SUBTERRANEAN FORMATION

(75) Inventors: B. Raghava Reddy, Duncan, OK (US); Larry S. Eoff, Duncan, OK (US); Danhua Leslie Zhang, Duncan, OK (US); Eldon D. Dalrymple, Duncan, OK (US); Paul S. Brown, Duncan, OK (US)

(73) Assignee: Halliburton Energy Services, Inc., Duncan, OK (US)

(*) Notice: Subject to any disclaimer, the term of this patent is extended or adjusted under 35 U.S.C. 154(b) by 393 days.

(21) Appl. No.: 11/655,403

(22) Filed: Jan. 19, 2007

(65) Prior Publication Data
US 2008/0176771 A1 Jul. 24, 2008

(51) Int. Cl.
C02F 5/08 (2006.01)
E21B 33/00 (2006.01)
C09K 8/60 (2006.01)

(52) U.S. Cl. .................. 507/234; 507/200; 507/233

(58) Field of Classification Search .............. 507/200, 507/233, 219, 234
See application file for complete search history.

(56) References Cited

U.S. PATENT DOCUMENTS

| | | | |
|---|---|---|---|
| 3,653,442 A | 4/1972 | Ross | |
| 4,074,536 A | 2/1978 | Young | |
| 4,185,087 A * | 1/1980 | Morlino | 510/122 |
| 4,197,912 A | 4/1980 | Barnhouse | |
| 4,226,284 A | 10/1980 | Evans | |
| 4,418,195 A | 11/1983 | Quinlan | |
| 4,596,662 A | 6/1986 | Walker et al. | |
| 4,891,166 A * | 1/1990 | Schaefer et al. | 554/39 |
| 5,098,979 A | 3/1992 | O'Lenick, Jr. | |
| 5,229,017 A | 7/1993 | Nimerick et al. | |
| 5,275,761 A * | 1/1994 | Bergmann | 510/122 |
| 5,310,002 A | 5/1994 | Blauch et al. | |
| 5,339,905 A | 8/1994 | Dowker | |
| 5,556,615 A * | 9/1996 | Janchitraponvej et al. | 424/70.11 |
| 5,602,224 A | 2/1997 | Vrckovnik et al. | |
| 5,616,758 A * | 4/1997 | McCarthy et al. | 556/423 |
| 5,630,474 A | 5/1997 | Burger et al. | |
| 5,741,367 A | 4/1998 | Inada et al. | |
| 6,030,931 A * | 2/2000 | Vinski et al. | 510/130 |
| 6,165,948 A | 12/2000 | Dewenter et al. | |
| 6,182,759 B1 | 2/2001 | Burger et al. | |
| 6,206,102 B1 | 3/2001 | Pusch et al. | |
| 6,660,693 B2 | 12/2003 | Miller et al. | |

(Continued)

FOREIGN PATENT DOCUMENTS

CA 2 545 563 A1 11/2006

(Continued)

OTHER PUBLICATIONS

Siltech Corporation, Technical Data Sheet Silquat® J15, Nov. 2004.

(Continued)

*Primary Examiner* — Timothy J. Kugel
*Assistant Examiner* — Aiqun Li
(74) *Attorney, Agent, or Firm* — Robert A. Kent; McDermott Will & Emery LLP

(57) ABSTRACT

Exemplary embodiments provide treatment fluids for treating a subterranean formation to improve gas production therefrom. Exemplary embodiments of the treatment fluids comprise a base fluid and a cationic polyorganosiloxane, wherein the cationic polyorganosiloxane comprises at least two cationic quaternary ammonium groups.

15 Claims, 7 Drawing Sheets

U.S. PATENT DOCUMENTS

| | | | |
|---|---|---|---|
| 7,723,274 B2 | 5/2010 | Zhang | |
| 2007/0015669 A1* | 1/2007 | Zhang | 507/200 |
| 2007/0123443 A1* | 5/2007 | Miralles et al. | 510/189 |
| 2008/0173451 A1 | 7/2008 | Reddy | |
| 2009/0120642 A1 | 5/2009 | Eoff | |

FOREIGN PATENT DOCUMENTS

| | | |
|---|---|---|
| WO | WO2006/116868 A1 | 11/2006 |
| WO | WO 2006/116868 A1 | 11/2006 |
| WO | WO 2007/033489 A2 | 3/2007 |

OTHER PUBLICATIONS

Siltech Corporation, Technical Data Sheet Silquat® J2, Nov. 2004.
Siltech Corp, Material Safety Data Sheet for Silquat® J15, Revised Apr. 15, 2005.
Siltech Corp, Material Safety Data Sheet for Silquat® J2, Nov. 1, 2004.
Siltech Corporation, Technical Data Sheet Silquat® A0, Apr. 2005.
Siltech Corp, Material Safety Data Sheet for Silquat® A0, Revised Feb. 1, 2006.
Siltech Corporation, Technical Data Sheet Silquat® D2, Nov. 2004.
Siltech Corp, Material Safety Data Sheet Silquat® D2, Revised Apr. 15, 2005.
Siltech Innovative Silicone Specialties, 2005 Siltech Corporation, Organo functional silicone compounds and related specialties, found at: http://www.siltechcorp.com/index.php?option=com_content&task=view&id=75Uitemid...
Office action dated Jan. 16, 2008 from U.S. Appl. No. 11/655,402.
Written Opinion and International Search Report for Application No. PCT/GB2008/000190, Jan. 17, 2008.
Office Action mailed Oct. 9, 2008, for U.S. Appl. No. 11/655,402.
Office Action for U.S. Appl. No. 11/655,402, dated May 1, 2009.
Office Action from U.S. Appl. No. 11/655,402 dated Jan. 13, 2010.
Office Action for European Patent Application No. 08701868.5 dated Aug. 13, 2010.
Office Action for Canadian Patent Application No. 2,675,126 dated Feb. 3, 2011.

* cited by examiner

COMPOSITIONS FOR INCREASING GAS PRODUCTION FROM A SUBTERRANEAN FORMATION

CROSS-REFERENCE TO RELATED APPLICATIONS

This application is related to U.S. patent application Ser. No. 11/655,402, entitled "Methods for Increasing Gas Production from a Subterranean Formation," filed on the same date herewith, the entire disclosure of which is incorporated herein by reference, as if fully set forth herein.

BACKGROUND

The present invention relates to compositions for increasing gas production from a subterranean formation. More particularly, the present invention relates to treatment fluids for treating a subterranean formation to improve the production of gas therefrom, the treatment fluids comprising a cationic polyorganosiloxane comprising at least two quaternary ammonium groups.

Hydrocarbon gases (e.g., natural gas) are found in subterranean formations beneath the Earth's surface. To obtain these gases, well bores are drilled into the gas-bearing formations through which the gas is produced to the surface. Gas production rates from these formations, however, are often less than expected or desired due to a variety of factors. One common factor for lower gas production rates is the presence of water in the flow channels available for gas flow. This water reduces the effective permeability of the formation to the natural gas and is commonly referred to as "water blocks."

The source of water contributing to the water blocks generally depends on the location of the water blocks themselves. For example, near well bore water blocks may be due to the invasion of water present in the well bore from well operations or from produced water. This water from the well bore may be imbibed by near well bore permeable zones into the flow channels and, thus, reduce gas production. If the water blocks are present in flow channels away from the well bore, the source of water may be due to the connate water held in permeable formation zones due to high capillary pressure. As this connate water moves toward the well bore with continued gas production, it may become trapped in some permeable zones, such as low permeability zones, thus blocking the flow of the gas. The source of water may also be from reservoir stimulation operations (e.g., matrix acidizing, fracturing, water control treatments with relative permeability modifiers, and the like), in which the injected fluids penetrate into the formation. However, in all these examples, if the natural drainage rates (e.g., due to gravity) or induced drainage rates (e.g., due to gas pressure) for the water are low, the water blocks will typically remain in the gas flow channels. As a result, the water blocks will reduce, or in some instances completely shut off, the production of gas from the formation. In some instances, water blocks may even delay gas production for a significant period of time after stimulation treatments.

SUMMARY

The present invention relates to compositions for increasing natural gas production from a subterranean formation. More particularly, the present invention relates to treatment fluids for treating a subterranean formation to improve the production of gas therefrom, the treatment fluids comprising a cationic polyorganosiloxane comprising at least two quaternary ammonium groups.

An exemplary embodiment of the present invention provides a treatment fluid for treating a subterranean formation to improve gas production therefrom. The treatment fluid comprises a base fluid and a cationic polyorganosiloxane, wherein the cationic polyorganosiloxane comprises at least two cationic quaternary ammonium groups. In one exemplary embodiment, the base fluid comprises an aqueous fluid and the cationic polyorganosiloxane is water-soluble. In another exemplary embodiment, the base fluid comprises a non-aqueous fluid and the cationic polyorganosiloxane is non-aqueous fluid soluble.

The features and advantages of the present invention will be apparent to those skilled in the art upon reading the following description of specific embodiments with reference to the accompanying drawings.

DRAWINGS

DESCRIPTION OF SPECIFIC EMBODIMENTS

Figure 1:
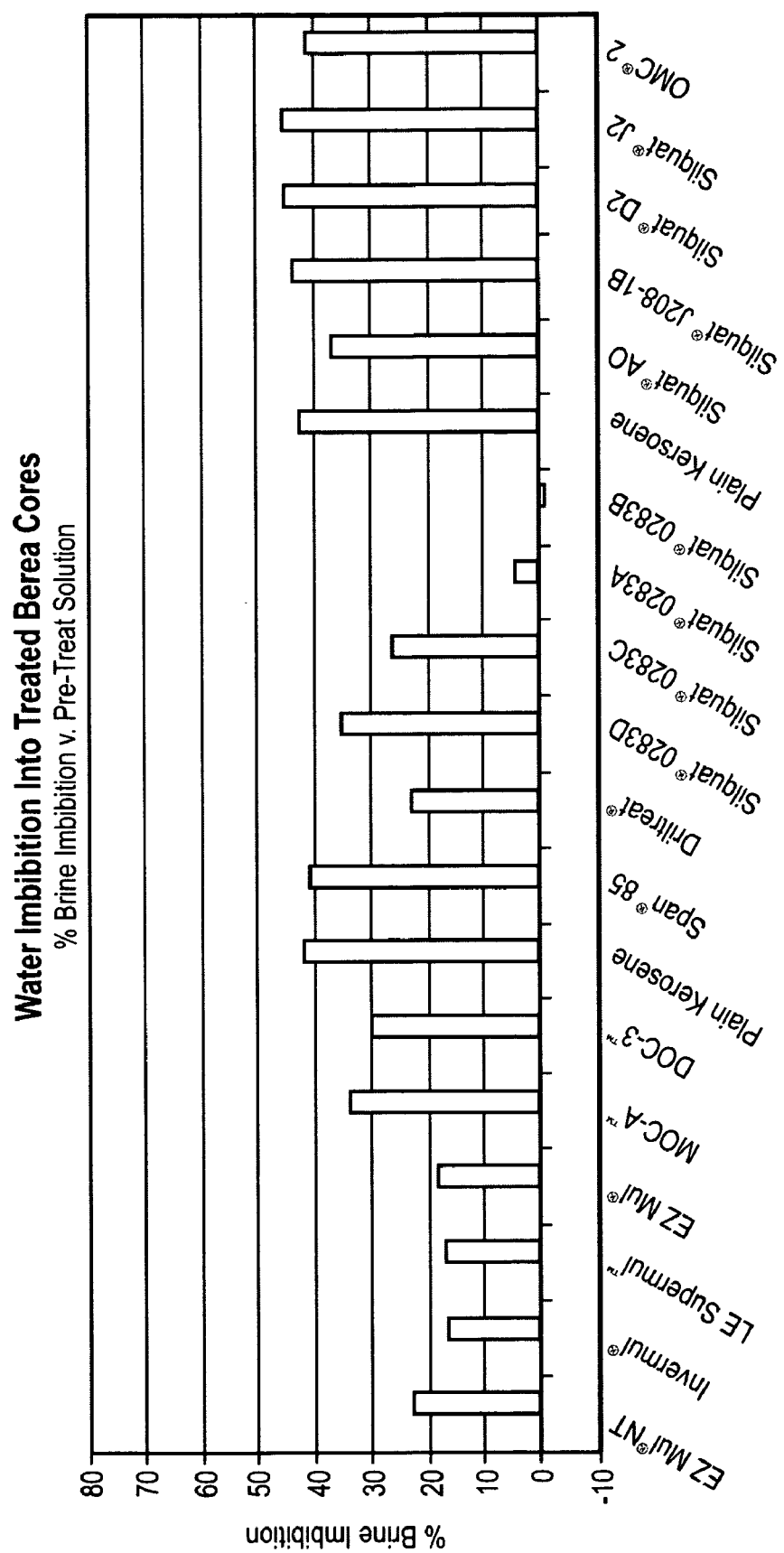
FIG. 1 is a graph of percent brine imbibition for Berea sandstone cores treated with certain materials in a kerosene-based carrier fluid.

The present invention relates to compositions for increasing natural gas production from a subterranean formation. More particularly, the present invention relates to treatment fluids for treating a subterranean formation to improve the production of gas therefrom, the treatment fluids comprising a cationic polyorganosiloxane comprising at least two quaternary ammonium groups. As used herein, the term "polyorganosiloxane" is used to refer to a polymer containing a polymer backbone of Si—O—Si bonds, wherein the silicon atoms in the polymer backbone are connected to alkyl groups via Si—C bonds except at the chain ends and branching points where the silicon atoms may be connected to either carbon or other atoms such as oxygen, nitrogen or sulfur and the like.

As will be appreciated by those of ordinary skill in the art, exemplary embodiments of the compositions and methods of the present invention may be used in any subterranean formation containing gas. This gas may be compressed gas contained within formation pores and/or gas that is adsorbed onto surfaces within the formation. By way of example, the techniques described herein may be used to treat coal beds to improve the recovery of natural gas found therein. Those of ordinary skill in the art will appreciate that gas found in coal beds is commonly referred to as "coalbed methane."

In accordance with exemplary embodiments of the present invention, a treatment fluid for treating a subterranean formation to improve the production of gas generally comprises a carrier fluid and a cationic polyorganosiloxane comprising at least two quaternary ammonium groups. The cationic polyorganosiloxane should improve gas production by reducing the occurrence of water blocks in the treated portion of the formation. Without being limited by theory, once introduced into the formation, the cationic polyorganosiloxane should adsorb onto surfaces in the treated portion of the formation. Once adsorbed, it is believed that the cationic polyoganosiloxane may increase the contact angle between water and formation surfaces. This may directly or indirectly lead to reduced capillary pressure in the porosity of the formation. Reduced capillary pressure may lead to increased water-drainage rates. As will be appreciated, improved water-drainage rates should allow a reduction in existing water blocks, as well as a reduction in the formation of water blocks. Moreover, it is also believed that the cationic polyorganosiloxane may reduce the tendency of the formation to imbibe water in the gas flow channels. In other words, it is believed that the cationic polyorganosiloxane should reduce the water-imbibition rates of the treated portion of the formation. As such, it is believed that treatment of the formation with the polyorganosiloxane may reduce the formation of water blocks in the treatment portion.

Any suitable carrier fluid may be used to introduce exemplary embodiments of the cationic polyorganosiloxane into the subterranean formation, including aqueous fluids, non-aqueous fluids, and combinations thereof. Examples of suitable aqueous fluids include fresh water and salt water. As will be appreciated, salt water refers to water containing one or more salts dissolved therein, for example, brines and seawater. Examples of suitable non-aqueous fluids include oxygenated solvents, hydrocarbon solvents, and combinations thereof. Exemplary oxygenated solvents that may be utilized include alcohols, glycols, esters, ethers, and combinations thereof. Specific examples of oxygenated solvents include methanol, ethanol, isopropanol, ethylene glycol, glycerol, ethyleneglycol monomethyl ether, ethyleneglycol monobutyl ether, di-isotridecyl ether and isobutyl oleate ester. Exemplary hydrocarbon solvents that may be utilized include gasoline, kerosene, toluene, xylene, alpha-olefins and mineral oils. Those of ordinary skill in the art will appreciate that, when a combination of an aqueous fluid and a non-aqueous fluid or a combination of a polar (e.g., an alcohol) non-aqueous fluid and a non-polar (e.g., a hydrocarbon) non-aqueous fluid is utilized, an agent may be included therein to facilitate the mixing of the fluids. Moreover, those of ordinary skill in the art should be able to select an appropriate carrier fluid for the cationic polyorganosiloxane based on a number of factors, including well conditions, formation characteristics, solubility of the cationic polyorganosiloxane, and other factors known to those of ordinary skill in the art. For example, in certain embodiments, methanol may be used when treating a coal bed.

As previously mentioned, exemplary embodiments of the cationic polyorganosiloxane may be introduced into the subterranean formation to increase gas production therefrom. In general, suitable polyorganosiloxanes comprise at least two quaternary ammonium groups. The quaternary ammonium groups may be present on the pendant groups (see Structure 1 below) or at the chain ends of the organosiloxane polymer chains (see Structure 2 below). The number of quaternary groups per chain of the organosiloxane is preferably at least two, and may range from 2 to 150 or from 2 to 70. In some exemplary embodiments, about 10% of silicon atoms in the polymer chain carry quaternary ammonium groups. The molecular weights of the polymers may be in the range of from about 1,000 to about 150,000. In some exemplary embodiments of the present invention, the molecular weights of the polymers may range from about 1,500 to about 50,000.

While a wide variety of polyorganosiloxanes may be suitable for use with the present technique, an exemplary embodiment of cationic polyorganosiloxane comprises polydimethysiloxane comprising at least two quaternary ammonium groups. Exemplary quaternary ammonium groups may comprise dialkyl methyl quaternary ammonium groups. The alkyl group of the dialkyl methyl quaternary ammonium groups may contain from about 1 to about 18 carbons. Another example of a suitable quaternary ammonium group comprises two hydroxyalkyl groups and a methyl group. Examples of suitable hydroxyalkyl groups include hydroxyethyl and hydroxypropyl groups. One such example is SILQUAT® 0283A silicone quat, an experimental product from Siltech Corporation which contains methyl dihydroxyethyl quaternary ammonium groups. Another example of suitable quaternary ammonium group comprises amide in one or more of the substituents on the quaternary nitrogen atom (see Structure 3 below). Examples of such materials include SILQUAT® AC silicone quat and SILQUAT® AD silicone quat available from SilTech Corporation. In one embodiment, the cationic polyorganosiloxane comprises a polydimethylsiloxane. Exemplary polydimethylsiloxanes that comprise a dialkyl quaternary ammonium groups are commercially available from Siltech Corporation, Toronto, Ontario, Canada, including SILQUAT® AO silicone quat, SILQUAT® D2 silicone quat, SILQUAT® AO silicone quat, SILQUAT® J2 silicone quat, and SILQUAT® J15 silicone quat. The cationic polydimethylsiloxanes from Siltech Corporation are generally provided as 70% by weight active solutions of the cationic polydimethylsiloxane in hexylene glycol, dipropylene glycol or isopropyl alcohol or they may be completely solvent free. The solubility of the polymers in water or organic solvents is generally determined by the number of branching, chain length, polar groups, for example hydroxyl, ester or ether groups on the pendant or chain end groups, and the functional groups attached to the quaternary ammonium nitrogen.

By way of example, a suitable cationic polydimethylsiloxane comprising at least two quaternary ammonium groups may have the structure shown below:

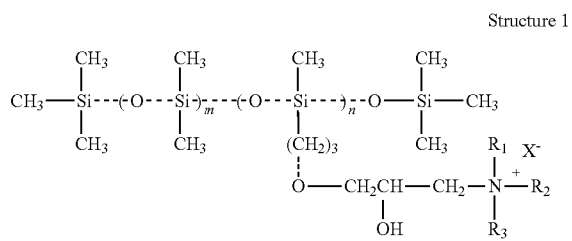

Structure 1 wherein $R_1$ and $R_2$ are independently alkyl groups comprising 1 to 18 carbons, or hydroxyalkyl groups such as hydroxyethyl or hydroxypropyl groups, $R_3$ is a methyl group, n is an integer in the range of from 2 to 150, m is an integer in the range of from 20 to 2,000, and $X^-$ is a compatible anion, such as fluoride, chloride, bromide, iodide, nitrate, or nitrite.

By way of example, another suitable polydimethylsiloxane comprising at least two dialkyl quaternary ammonium groups may have the structure shown below:

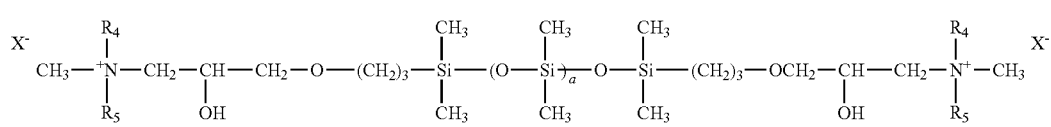

Structure 2 wherein $R_4$ and $R_5$ are independently alkyl groups comprising 1 to 18 carbons, or hydroxyalkyl groups such as hydroxyethyl or hydroxypropyl groups, a is an integer in the range of from 10 to 2,000, and $X^-$ is a compatible anion, such as fluoride, chloride, bromide, iodide, nitrate, or nitrite.

By way of example, another suitable polydimethylsiloxane comprising at least two dialkyl quaternary ammonium groups may have the structure shown below:

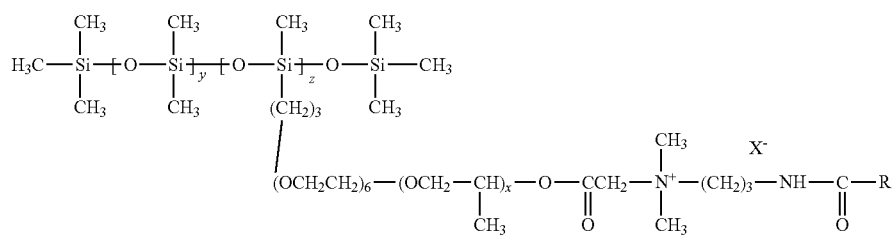

Structure 3 wherein R is an alkyl group comprising 1 to 18 carbons, or a hydroxyalkyl group such as a hydroxyethyl or hydroxypropyl group, x is an integer in the range from 2 to 150, Y is an integer in the range of from 10 to 2,000, z is an integer in the range of from 10 to 2,000, and $X^-$ is a compatible anion, such as fluoride, chloride, bromide, iodide, nitrate, or nitrite.

Exemplary embodiments of the cationic polyorganosiloxane may be present in the treatment fluid in an amount sufficient to provide the desired end result. In an exemplary embodiment of the present invention, the cationic polyorganosiloxane may be present in the treatment fluid in an amount in the range of from about 0.1% to about 10% by weight of the treatment fluid. In certain exemplary embodiments, the cationic polyorganosiloxane may be present in the treatment in an amount in the range of from about 0.5% to about 5% by weight of the treatment fluid.

Those of ordinary skill in the art will recognize that other additives suitable for use in subterranean treatments may also be included in exemplary embodiments of the treatment fluids of the present invention. Examples of such additives may include corrosion inhibitors, viscosifiers such as polysaccharides and gums, hydrophilic polymers, crosslinking agents, mineral and organic acids, surfactants, particulates such as sand or proppant materials, and combinations thereof.

As previously mentioned, exemplary embodiments of the polyorganosiloxanes may be used to treat subterranean formations to reduce water blocks therein, thereby improving gas production. An example of a method of treating a subterranean formation to improve gas production therefrom comprises introducing a cationic polyorganosiloxane into the subterranean formation. As previously mentioned, the cationic polyorganosiloxane comprises at least two quaternary ammonium groups. Those of ordinary skill in the art will appreciate that the cationic polyorganosiloxane may be introduced into the formation at any point in the life of the well to achieve the desired end result. By way of example, the cationic polyorganosiloxane may be used in a remedial treatment of a subterranean formation from which gas production rates are less than desired or expected due to, among other things, water blocks. In another example, the cationic polyorganosiloxane may be used to treat a subterranean formation prior to initial gas production therefrom. For example, the cationic polyorganosiloxane may be used to treat the formation after drilling of the well bore, but prior to the well being placed into production. In one example, the cationic polyorganosiloxane may be introduced into the formation in conjunction with another treatment performed in the well bore. For example, the cationic polyorganosiloxane may be included in a treatment fluid (such as a fracturing fluid, completion fluid, etc.) that is introduced into the well bore. In one exemplary embodiment, a fracturing fluid comprising the cationic polyorganosiloxane may be introduced into the subterranean formation at a pressure sufficient to create or enhance one or more fractures in the formation. The fluid comprising the cationic polyorganosiloxane may be introduced prior to or subsequent to fracturing operation. In other words, the cationic polyorganosiloxane may be included in a pre-fracturing fluid referred to as a "prepad" or it may be part of a fluid that immediately follows the fracturing fluid.

To facilitate a better understanding of the present technique, the following examples of some specific embodiments are given. In no way should the following examples be read to limit, or to define, the scope of the invention.

Example 1

A series of tests was performed to analyze the effects of a variety of materials on the water-imbibition and water-drainage rates of sandstone cores with a hydrocarbon as the carrier fluid. In each of these tests, the treatment fluid comprised 1.0% wt/vol of the tested material in kerosene. For a control, tests were also performed with only the kerosene itself.

These tests were performed using high permeability (200-300 millidarcy) Berea sandstone cores in accordance with the following procedure. The Berea sandstone cores measured about 1 inch in diameter and about 2.8-3.3 inches in length. First, a dry core was vacuum saturated with the treatment fluid for two hours by submerging the dry core in the test fluid placed in a loosely capped container that is kept in a vacuum chamber. It was determined that the core was fully saturated with the treatment fluid when no air bubbles could be seen exiting the core. The core was then weighed to determine the saturated core weight. Using the density of the carrier fluid, the pore volume of the core was determined based on the difference between the saturated core weight and the unsaturated core weight.

Next, the saturated core was wrapped along its length in a plastic film and placed into a suction flask assembly. Once the saturated core was placed in the suction flask assembly, the saturated core was subjected to lab vacuum at both ends, until no more fluid came through the core (about 30 minutes). The core was then removed from the suction flask assembly and weighed. Using the density of the carrier fluid, the residual oil saturation ($S_{or}$) of the core was determined based on the difference between the saturated core weight and the weight after the lab vacuum treatment. The $S_{or}$ is representative of the drainage rate for the core after treatment. From this data, the pore volume occupied by the residual carrier fluid and the unoccupied pore volume were determined.

Thereafter, the core was placed in 10 milliliters of a 7% potassium chloride solution in a small cup such that the entire surface of one end of the core was exposed to the brine to facilitate brine imbibition. After 10 minutes of exposure to the brine, the core was again weighed. Based on the difference between the weight of the core after brine exposure and the weight of the core after the lab vacuum treatment, the volume of the brine imbibed into the core can be determined. By dividing the volume of the imbibed brine and the unoccupied pore volume, a percent value for brine imbibition into available porosity was calculated.

The percent brine imbibition into available porosity for each of the tested materials is shown in Table 1 below and is also shown in FIG. 1. The residual oil saturation (% $S_{or}$) for each of the tested materials is also shown on Table 1 below. As will be appreciated, the drainage rates (represented by the percent $S_{or}$) for this series of tests are less relevant because they are not for a water-based fluid and do not indicate how the tested materials would effect drainage rates of a water-based fluid.

After the brine-imbibition tests were completed, a drop of water was placed on one end of the core and the time needed for the absorption of the water droplet into the core was estimated. The values of these measurements are given in Table 1 below and are expected to be a reflection of the oil-wet nature of the treated surface. If the droplet of water took longer to become absorbed, it retained its shape for longer periods indicating contact angles reflective of increased oil-wet nature of the treated surface.

TABLE 1

Kerosene-Based Treatments

| Material | Chemical Description | Supplier | % $S_{or}$ | % Brine Imbibition into Available Porosity | Time for Water drop Absorption, minutes |
|---|---|---|---|---|---|
| Kerosene (Test #1) | — | — | 54.0 | 43.0 | 1-2 |
| Kerosene (Test #2) | — | — | 55.0 | 42.0 | 1-2 |
| EZ MUL ® NT emulsifier | Polyaminated fatty acid | Halliburton Energy Services, Inc. | 58.1 | 22.3 | >5 |
| INVERMUL ® emulsifier | Blend of oxidized tall oil and polyaminated fatty acid | Halliburton Energy Services, Inc. | 55.0 | 16.6 | >5 |
| LE SUPERMUL ™ emulsion stabilizer | Polyaminated fatty acid | Halliburton Energy Services, Inc. | 69.5 | 17.0 | 1-5 |
| EZ MUL ® additive | Polyaminated fatty acid | Halliburton Energy Services, Inc. | 67.9 | 18.6 | 1-5 |
| MOC-A ™ surfactant | Dodecylbenzenesulfonate salt | Halliburton Energy Services, Inc. | 56.2 | 33.6 | immediate |
| DOC-3 ™ surfactant | Substituted Imidazoline from condensation of polyamine with a fatty acid | Halliburton Energy Services, Inc. | 57.6 | 29.2 | immediate |
| SPAN ® 85 surfactant | Sorbitan trioleate | Aldrich Chem. Co. | 57.1 | 40.0 | 1-2 |
| DRILTREAT ® additive | Lechithin dispersion | Halliburton Energy Services, Inc. | 62.8 | 23.0 | 1-2 |
| Experimental Product-SILQUAT ® 0283A silicone quat | Oil-soluble PDMS with quaternary ammonium chain end without long chain alkyl groups | Siltech Corp. | 54.0 | 4.28 | >20 |
| Experimental Product-SILQUAT ® 0283B silicone quat | Oil-soluble PDMS with quaternary ammonium chain end with two long chain alkyl groups | Siltech Corp. | 56.4 | −0.03 | 5-10 |

TABLE 1-continued

Kerosene-Based Treatments

| Material | Chemical Description | Supplier | % $S_{or}$ | % Brine Imbibition into Available Porosity | Time for Water drop Absorption, minutes |
|---|---|---|---|---|---|
| Experimental product-SILQUAT ® 0283C silicone quat | Oil-soluble PDMS with quaternary ammonium chain end with long chain alkyl groups | Siltech Corp. | 57.0 | 26.0 | <1 |
| Experimental product-SILQUAT ® 0283D silicone quat | Oil-soluble PDMS with quaternary ammonium chain end without long chain alkyl groups | Siltech Corp. | 62.3 | 35.2 | <1 |
| SILQUAT ® AO silicone quat | Water-soluble organomodified PDMS silicone with dialkylmethyl quaternary ammonium chain end | Siltech Corp. | 60.7 | 37.0 | <10 sec |
| SILQUAT ® J208-1B silicone quat | Water-soluble organomodified PDMS silicone with dialkylmethyl quaternary ammonium chain end | Siltech Corp. | 57.8 | 43.7 | <10 sec |
| SILQUAT ® D2 silicone quat | Water-soluble organomodified PDMS silicone with dialkylquaternary ammonium chain end | Siltech Corp. | 57.3 | 45.4 | <10 sec |
| SILQUAT ® J2 silicone quat | Water-soluble organomodified PDMS silicone with dialkylmethyl quaternary ammonium chain end | Siltech Corp. | 55.1 | 45.6 | <10 sec |
| OMC ® 2 oil mud conditioner | Oligomeric fatty acid | Halliburton Energy Services, Inc. | 53.8 | 41.4 | 5-10 |

The results for this series of tests indicate that the brine-imbibition rates are lower for certain of these cationic polyorganosiloxanes. It is believed that a lower brine-imbibition rate indicates that the core wettability has been modified to a less water-wet condition, which is consistent with the increased time period observed for the water drops to be absorbed into the core. The latter observation is also consistent with increased contact angles (not measured) due to the less-water wetting core surface. Moreover, contact angle data for the core surface were the highest for the materials with the lowest brine-imbibition rates, except for the OMC®2 oil mud conditioner. Accordingly, this result suggests that materials that provide lower brine-imbibition rates are characterized by their ability to modify the core surface to have higher contact angles for the water-to-formation interface.

Example 2

An additional series of tests was performed to further analyze the effects of a variety of materials on the water-imbibition and water-drainage rates of sandstone cores using a water-based carrier fluid. The treatment fluids used in this series of tests comprised 1.0% wt/vol of the tested material in a 7% potassium chloride solution, except for HPT™-1 chemical additive, which was used in an amount of 0.2% wt/vol. For a control, tests were also performed with only the potassium chloride solution itself.

These tests were performed using high permeability (200-300 millidarcy) Berea sandstone cores in accordance with the following procedure. The Berea sandstone cores measured about 1 inch in diameter and about 2.8-3.3 inches in length. First, a dry core was vacuum saturated with the treatment fluid for four hours. It was determined that the core was fully saturated with the treatment fluid when no air bubbles could be seen exiting the core. The core was then weighed to determine the saturated core weight. Using the density of the carrier fluid, the pore volume of the core was determined based on the difference between the saturated core weight and the unsaturated core weight.

Figure 2:
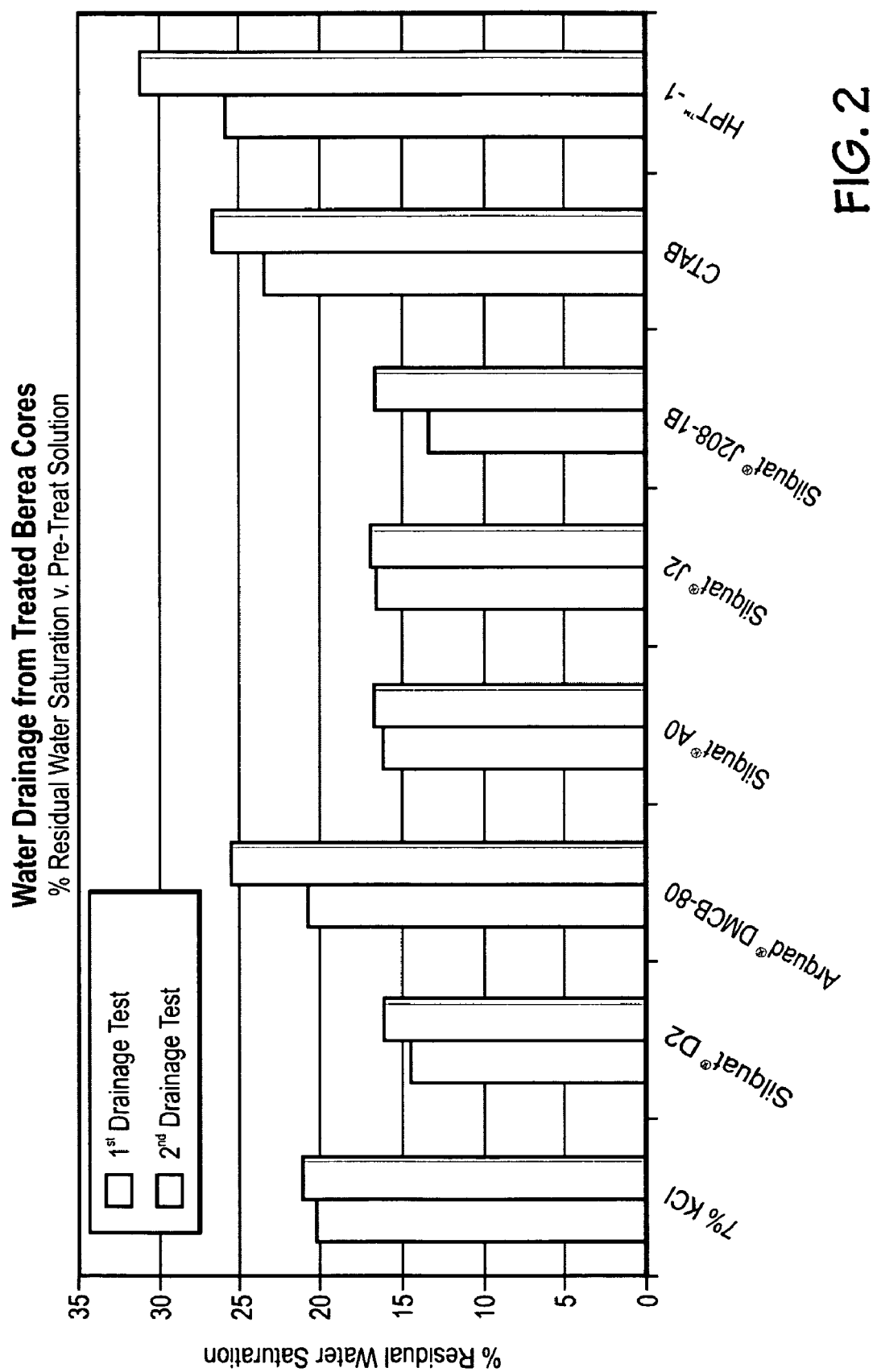
FIG. 2 is a graph of percent residual water saturation for Berea sandstone cores treated with certain materials in a brine-based carrier fluid.
Figure 3:
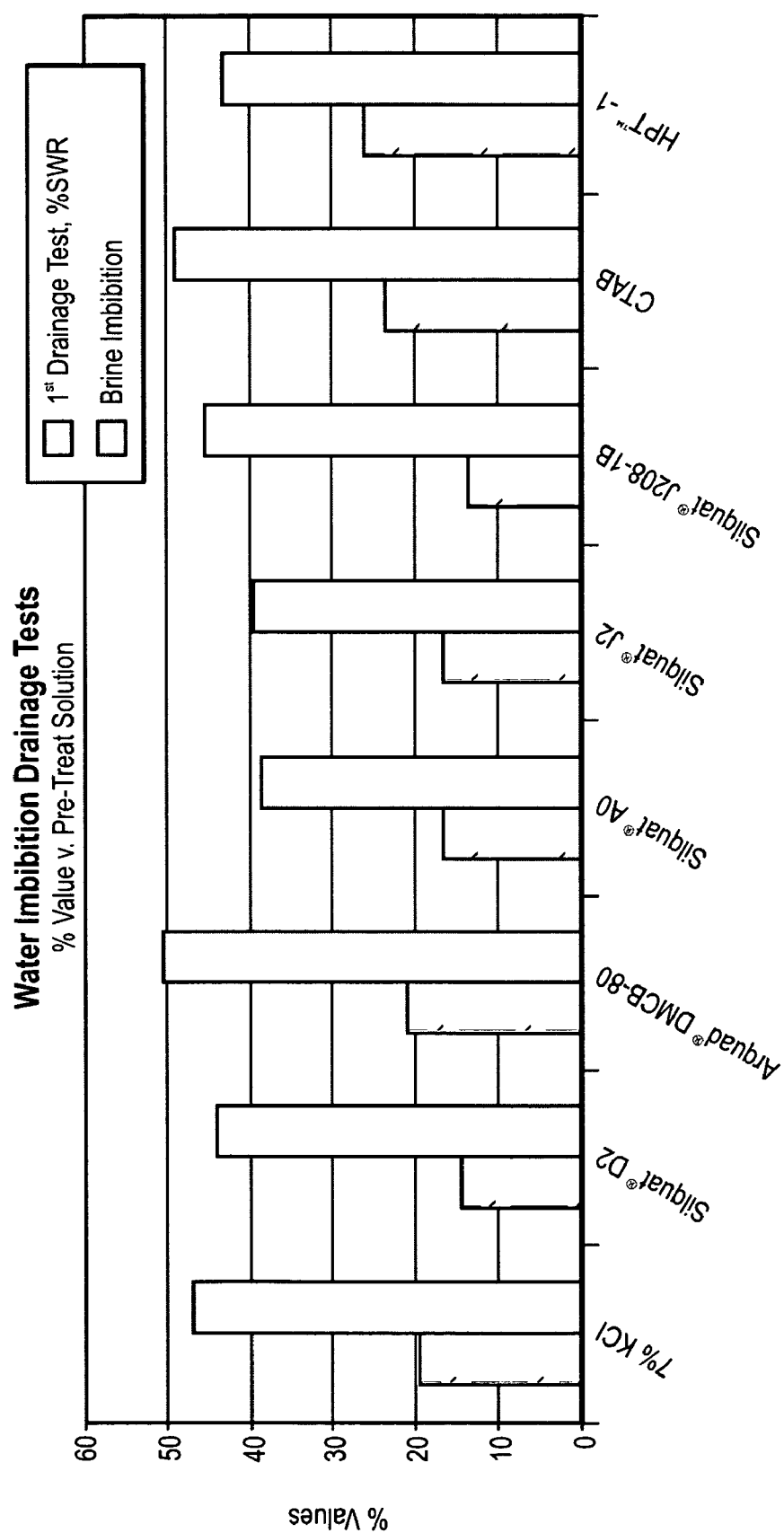
FIG. 3 is a graph of brine imbibition and percent residual water saturation for Berea sandstone cores treated with certain materials in a brine-based carrier fluid.

Next, the saturated core was centrifuged for 20 hours on each end at 1,440 rpm. The core was then removed from the centrifuge and weighed. Using the density of the carrier fluid, the residual water saturation ($S_{wr}$) of the core was determined based on the difference between saturated core weight and the weight after the centrifuge treatment. The % $S_{wr}$ for this first water-drainage test is shown below in Table 2 as well as on FIGS. 2 and 3. The residual water saturation is representative of the water-drainage rate for the core after treatment. From this data, the pore volume occupied by the residual treatment fluid and the unoccupied pore volume were determined.

Thereafter, the core was placed in 10 milliliters of a 7% potassium chloride solution in a small cup such that the entire surface of one end of the core was exposed to the brine to facilitate brine imbibition. This entire assembly was placed into a closed bottle. After two hours of exposure to the brine, the core was again weighed. Based on the difference between the weight of the core after brine exposure and the weight of the core after the centrifuge treatment, the volume of the brine imbibed into the core can be determined. By dividing the volume of the imbibed brine and the unoccupied pore volume, a percent value for brine imbibition into available porosity was calculated. The % brine imbibition for this test is shown below in Table 2 as well as on FIG. 3.

Figure 4:
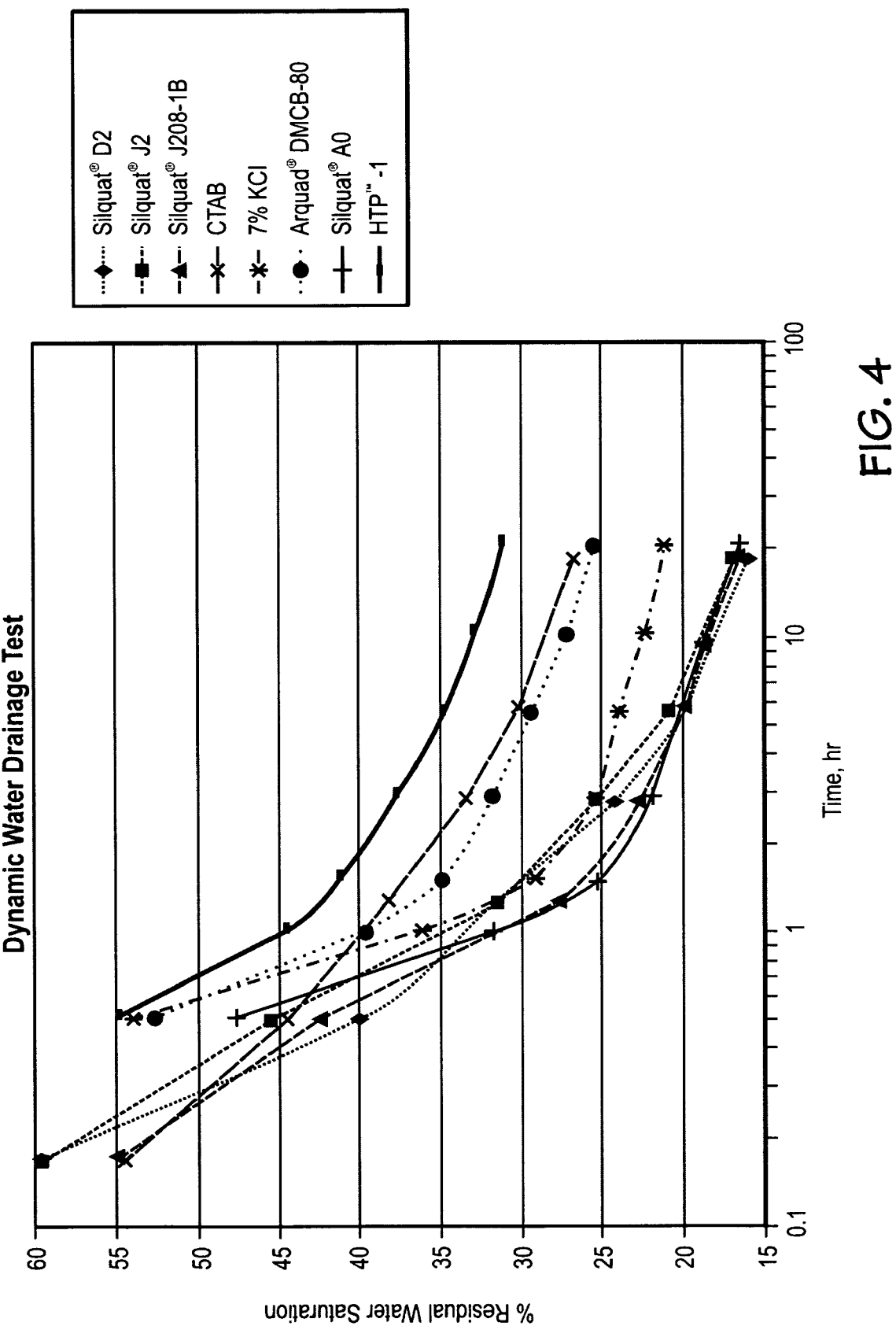
FIG. 4 is a graph of residual water saturation as a function of time for Berea sandstone cores treated with certain materials in a brine-based carrier fluid.

After the brine-imbibition test, a second water-drainage test was performed on the core. The core was immersed in 100 milliliters of a 7% sodium chloride solution and subjected to vacuum for three hours. Then, the core was centrifuged at 1,440 rpm, and the water-drainage rate was calculated as a function of time over a period of 21 hours to provide dynamic-water-drainage results. Measurements of the core weight were taken periodically by removing the core from the centrifuge. A final measurement of the core weight was recorded after 21 hours. From these measurements, the percent $S_{wr}$ was determined as described above. The final percent $S_{wr}$ for this second water-drainage test is shown below in Table 2 as well as on FIG. 2. In addition, the dynamic water-drainage results are provided on FIG. 4 as percent $S_{wr}$ as a function of time.

As previously mentioned, the percent $S_{wr}$ for the first water-drainage test, the percent $S_{wr}$ for the second water-drainage tests, and the percent brine imbibition for each of the tested materials are shown in Table 2 below. As previously mentioned, the percent $S_{wr}$ represents the water-drainage rate.

rates. They need to be part of a polyorganosiloxane polymer chain to be effective in lowering the imbibition rates.

Example 3

An additional series of tests was performed to further analyze the effects of a variety of materials on the water-imbibition and water-drainage rates of sandstone cores. The treatment fluids used in this series of tests comprised 1.0% wt/vol of the tested material in methanol, except for HPT™-1 chemical additive, which was used in an amount of 0.2% wt/vol. For a control, tests were also performed with only methanol itself.

These tests were performed using high permeability (200-300 millidarcy) Berea sandstone cores in accordance with the following procedure. The Berea sandstone cores measured about 1 inch in diameter and about 2.8-3.3 inches in length. First, a dry core was vacuum saturated with the treatment fluid for two hours. It was determined that the core was fully saturated with the treatment fluid when no air bubbles could be seen exiting the core. The core was then weighed to deter-

TABLE 2

Brine-Based Treatments

| Material | Chemical Description | Supplier | % $S_{wr}$ ($1^{st}$ Drainage Test) | % $S_{wr}$ ($2^{nd}$ Drainage Test) | % Brine Imbibition |
|---|---|---|---|---|---|
| 7% KCl | — | — | 20.2 | 21.1 | 47.1 |
| SILQUAT ® D2 silicone quat | Water-soluble organomodified PDMS silicone with dialkylquaternary ammonium chain end | Siltech Corp. | 14.5 | 16.0 | 43.9 |
| Arquad ® DMCB-80 | Cocobenzyldimethylammonium chloride | Akzo Nobel | 20.8 | 25.5 | 50.6 |
| SILQUAT ® AO silicone quat | Water-soluble organomodified PDMS silicone with dialkylquaternary ammonium chain end | Siltech Corp. | 16.3 | 16.7 | 38.7 |
| SILQUAT ® J2 silicone quat | Water-soluble organomodified PDMS silicone with dialkylquaternary ammonium chain end | Siltech Corp. | 16.6 | 16.9 | 39.6 |
| SILQUAT ® J208-1B silicone quat | Water-soluble organomodified PDMS silicone with dialkylquaternary ammonium chain end | Siltech Corp. | 13.4 | 16.6 | 45.4 |
| CTAB | Cetyltrimethylammonium bromide | Aldrich Chem. Co. | 23.4 | 26.7 | 48.9 |
| HPT ™-1 additive | Hydrophobically modified water soluble poly-(dimethylaminoethylmethacrylate) | Halliburton Energy Services, Inc. | 25.9 | 31.1 | 43.0 |

The results of this series of tests show that the water-drainage rates (represented by the $S_{wr}$) are consistently lower for the cationic polyorganosiloxanes that comprise at least two cationic quaternary ammonium groups when compared to the other materials tested. As illustrated by the dynamic-water-drainage rates shown in FIG. 4, the four cationic polyorganosiloxanes tested have the fastest water-drainage rates. Regarding water imbibition, this series of tests also indicates that the water-imbibition rates of the cores treated with the cationic polyorganosiloxanes had lower values than other materials tested. In addition, it was surprisingly found that the percent brine imbibition increased for quaternary ammonium surfactants without the silicon-based structure, such as for the CTAB and the ARQUAD® DMCB-80. This observation indicates, use of monomeric quaternary ammonium salts with long alkyl chains is not sufficient to lower the imbibition mine the saturated core weight. Using the density of the carrier fluid, the pore volume of the core was determined based on the difference between the saturated core weight and the unsaturated core weight. The core was then allowed to sit at ambient temperature and pressure overnight.

Next, the saturated core was centrifuged alternately for 10 minutes on each end for a total of 40 minutes per core at 1,440 rpm. The core was then removed from the centrifuge and weighed. Using the density of the carrier fluid, the residual methanol saturation ($S_{mr}$) of the core was determined based on the difference between saturated core weight and the weight after the centrifuge treatment. The % $S_{mr}$ for this first drainage test is shown below in Table 3. The residual methanol saturation is representative of the drainage rate for the core after treatment. From this data, the pore volume occupied by the residual treatment fluid and the unoccupied pore volume were determined.

Figure 5:
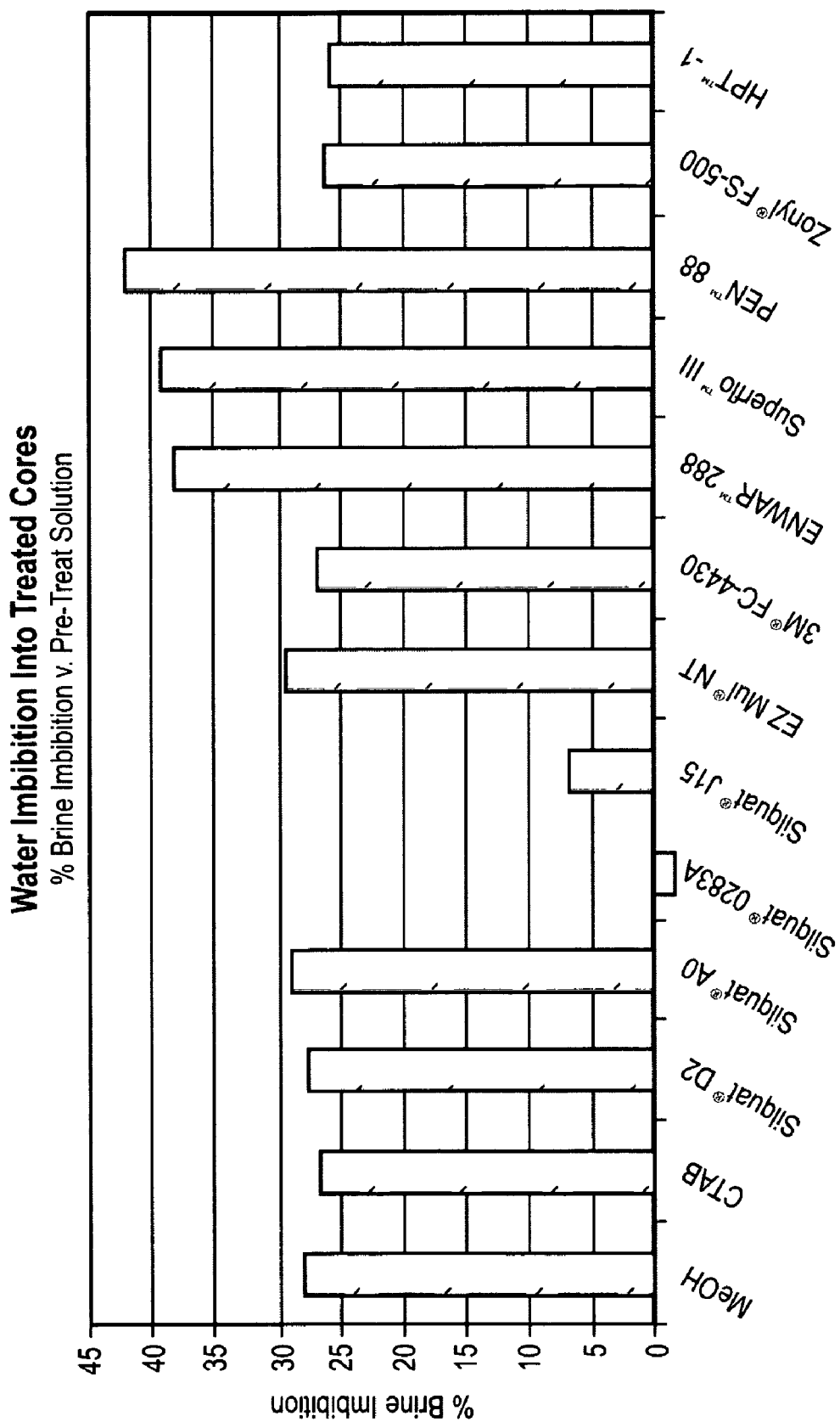
FIG. 5 is a graph of percent brine imbibition for Berea sandstone cores treated with certain materials in a methanol-based carrier fluid.
Figure 6:
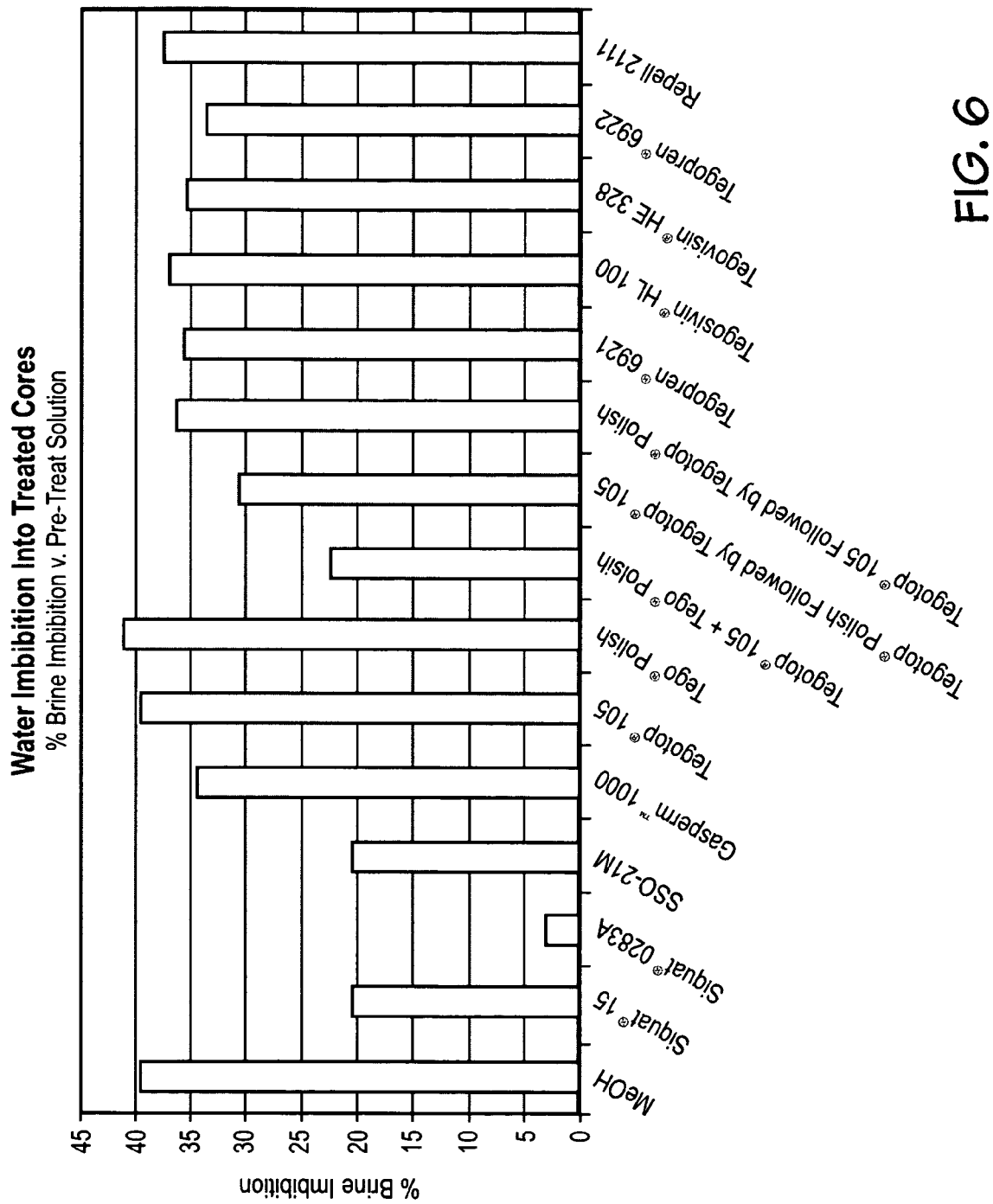
FIG. 6 is a graph of percent brine imbibition for Berea sandstone cores treated with certain materials in a methanol-based carrier fluid.

Thereafter, the core was placed in 10 milliliters of a 7% potassium chloride solution in a small cup such that the entire surface of one end of the core was exposed to the brine to facilitate brine imbibition. This entire assembly was placed into a closed bottle. After 10 minutes of exposure to the brine, the core was again weighed. Based on the difference between the weight of the core after brine exposure and the weight of the core after the centrifuge treatment, the volume of the brine imbibed into the core can be determined. By dividing the volume of the imbibed brine and the unoccupied pore volume, a percent value for brine imbibition into available porosity was calculated. The % brine imbibition for this test is shown below in Table 3 as well as in FIGS. 5 and 6.

Figure 7:
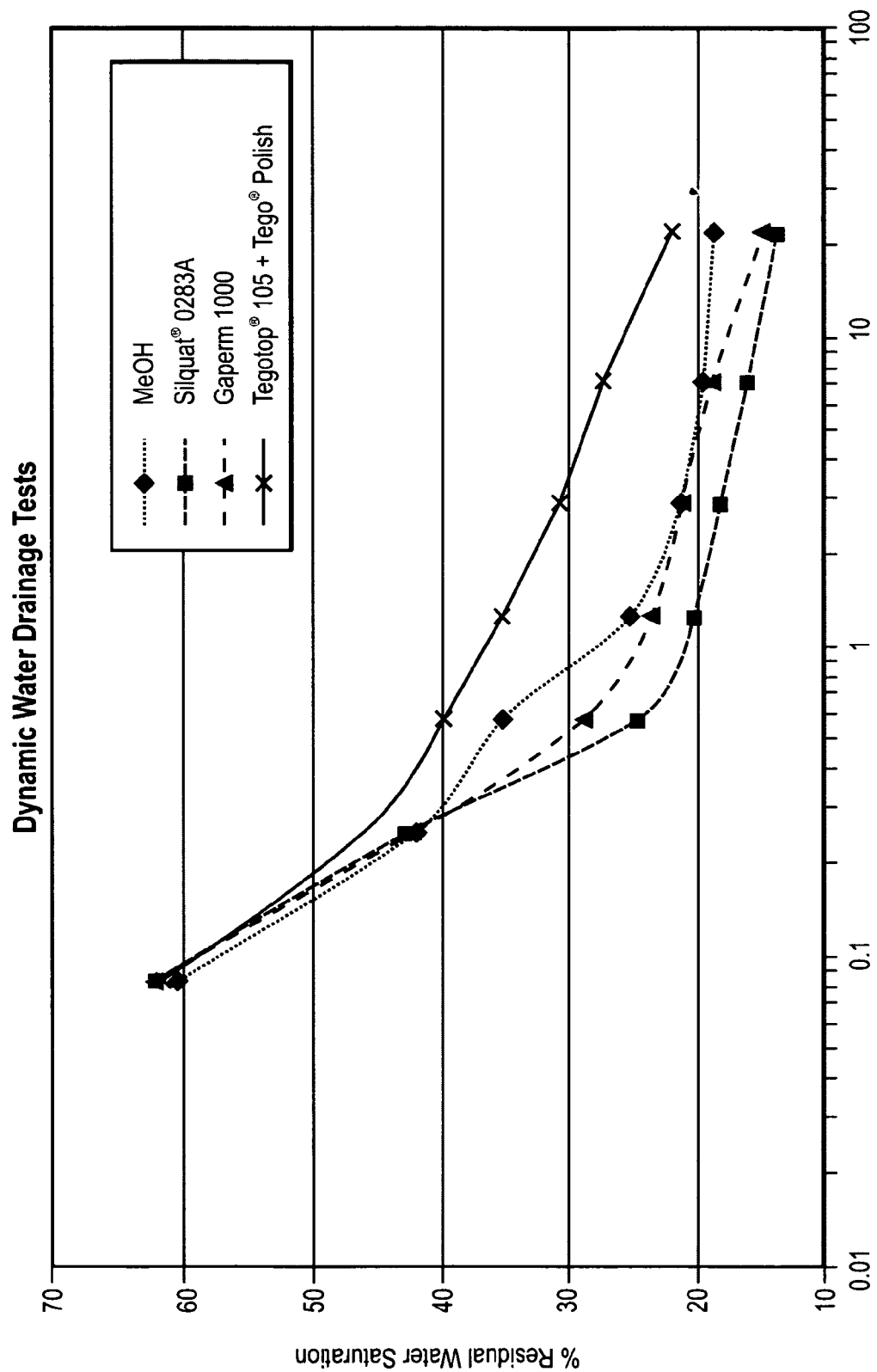
FIG. 7 is a graph of residual water saturation as a function of time for Berea sandstone cores treated with certain materials in a methanol-based carrier fluid.

After the brine-imbibition test, another water-drainage test was performed on the core. The core was immersed in 100 milliliters of a 7% potassium chloride solution and subjected to vacuum for three hours. Then, the core was centrifuged at 1,440 rpm, and the water-drainage rate was calculated as a function of time over a period of 22 hours to provide dynamic-water-drainage results. Measurements of the core weight were taken periodically by removing the core from the centrifuge. A final measurement of the core weight was recorded after 22 hours. From these measurements, the percent $S_{wr}$ was determined as described above. The final percent $S_{wr}$ for this second drainage test is shown below in Table 3. In addition, the dynamic water-drainage results are provided on FIG. 7 as percent $S_{wr}$ as a function of time.

As previously mentioned, the percent $S_{mr}$ for the first drainage test, the percent $S_{wr}$ for the second drainage test, and the percent brine imbibition for each of the tested materials are shown in Table 3 below. As will be appreciated, the drainage rates (represented by the percent $S_{mr}$) for the first drainage tests are less relevant because they are not for a water-based fluid and do not indicate how the tested materials would effect drainage rates of a water-based fluid.

TABLE 3

Methanol-Based Treatments

| Material | Chemical Description | Supplier | % $S_{mr}$ (first drainage test) | % $S_{wr}$ (second drainage test) | % Brine Imbibition |
| --- | --- | --- | --- | --- | --- |
| Methanol | — | — | 21.7 | n.d. | 27.8 |
| CTAB | Cetyltrimethylammonium bromide | Aldrich Chem. Co. | 23.9 | n.d. | 26.6 |
| SILQUAT ® D2 silicone quat | Water soluble organomodified PDMS silicone with dialkylquaternary ammonium chain end | Siltech Corp. | 22.0 | n.d. | 27.7 |
| SILQUAT ® AO silicone quat | Water soluble organomodified PDMS silicone with dialkylquaternary ammonium chain end | Siltech Corp. | 23.6 | n.d. | 29.0 |
| Experimental Product—SILQUAT 0283 ® A silicone quat | Oil-soluble PDMS with quaternary ammonium chain end without long chain alkyl groups | Siltech Corp. | 20.9 | n.d. | −1.7 |
| SILQUAT ® J15 silicone quat | Water-soluble organomodified PDMS silicone with dialkylquaternary ammonium chain end | Siltech Corp. | 21.1 | n.d. | 6.8 |
| EZ MUL ® NT emulsifier | Polyaminated fatty acid | Halliburton Energy Services, Inc. | 23.7 | n.d. | 29.3 |
| FC 4430 | Non-ionic polymeric fluorocarbon compound | 3M Corporation | 27.3 | n.d. | 26.9 |
| ENWAR ™ 288 additive | Cationic fluorocarbon | Halliburton Energy Services, Inc. | 15.5 | n.d. | 38.3 |
| SUPERFLO ™ surfactant | Nonionic fluorocarbon surfactant blend | Halliburton Energy Services, Inc. | 16.2 | n.d. | 39.2 |
| PEN ™ 88 additive | NONYLphenol ethoxylate | Halliburton Energy Services, Inc. | 24.5 | n.d. | 42.1 |
| ZONYL ® FS-500 fluoro additive | Non-ionic fluoroaklyl compound | Dupont | 17.5 | n.d. | 26.2 |
| HPT ™-1 chemical additive | Hydrophobically modified water soluble poly-(dimethylaminoethylmethacrylate) | Halliburton Energy Services, Inc. | 20.9 | n.d. | 25.7 |
| Methanol | — | — | 18.7 | 18.5 | 39.5 |
| SILQUAT ® J15 silicone quat | Water-soluble organomodified PDMS silicone with dialkylquaternary ammonium chain end | | 23.7 | | 20.6 |

TABLE 3-continued

Methanol-Based Treatments

| Material | Chemical Description | Supplier | % $S_{mr}$ (first drainage test) | % $S_{wr}$ (second drainage test) | % Brine Imbibition |
|---|---|---|---|---|---|
| Experimental Product—SILQUAT 0283 ® A silicone quat | Oil soluble PDMS with quaternary ammonium chain end without long chain alkyl groups | Siltech Corp. | 20.7 | 13.7 | 3.0 |
| SSO-21M | Non-ionic surfactant blend | Halliburton Energy Services, Inc. | 27.3 | n.d. | 20.5 |
| GASPERM ™ 1000 | Non-ionic surfactant blend | Halliburton Energy Services, Inc. | 23.0 | 14.8 | 34.6 |
| TEGOTOP ® 105 agent | Highly disperse silicon dioxide nano-particles in silicone wax and cyclomethicone | Degussa AG | 21.7 | n.d. | 39.5 |
| TEGO ® Polish | Methylpolysiloxane | Degussa AG | 21.7 | n.d. | 41.2 |
| TEGOTOP ® 105 agent + TEGO ® Polish | Highly disperse silicon dioxide nano-particles in silicone wax and cyclomethicone plus Methylpolysiloxane | Degussa AG | 23.4 | 21.9 | 22.5 |
| TEGO ® Polish followed by TEGOTOP ® 105 agent | Methylpolysiloxane followed by Highly disperse silicon dioxide nano-particles in silicone wax and cyclomethicone | Degussa AG | 21.8 | n.d. | 30.7 |
| TEGOTOP ® 105 agent followed by TEGO ® Polish | Highly disperse silicon dioxide nano-particles in silicone wax and cyclomethicone followed by Methylpolysiloxane | Degussa AG | 19.4 | n.d. | 36.4 |
| TEGOPREN ® 6921 agent | Diquaternary polydimethylsiloxane in propanediol | Degussa AG | 23.3 | n.d. | 35.7 |
| TEGOSIVIN ® HL100 agent | Methylethoxy polysiloxane | Degussa AG | 24.9 | n.d. | 37.0 |
| TEGOsivin ® HE328 agent | Silane/Siloxanes emulsion | Degussa AG | 26.3 | n.d. | 35.4 |
| TEGOPREN ® 6922 agent | Diquaternary polydimethylsiloxane | Degussa AG | 24.7 | n.d. | 33.6 |
| Repell 2111 agent | Triethoxy (3,3,4,4,5,5,6,6,7,7,8,8,8-tridecafluorooctyl) silane | Degussa AG | 22.8 | n.d. | 37.6 |

The results of this series of tests show that the brine-imbibition rates for the cores are consistently lower for the polyorganosiloxanes that comprise at least two quaternary ammonium groups when compared to the other materials tested. Surprisingly, these polyorganosiloxanes exhibited superior imbibition rates even when compared to the fluoro polymer-based materials tested, such as the FC 4430, ENWAR® 288 additive, and the SUPERFLO™ surfactant, which are expected to have high interfacial surface tension reduction in addition to increasing contact angles.

Therefore, the present invention is well adapted to attain the ends and advantages mentioned as well as those that are inherent therein. The particular embodiments disclosed above are illustrative only, as the present invention may be susceptible to various modifications and alternative forms. However, it should be understood that the invention is not intended to be limited to the particular embodiments disclosed. Rather, the present invention is to cover all modifications, equivalents, and alternatives falling within the scope and spirit of the present invention as defined by the following appended claims.

What is claimed is:

1. A treatment fluid for treating a subterranean formation to improve gas production therefrom, the treatment fluid comprising:

a non-aqueous fluid comprising an oxygenated solvent; and a cationic polyorganosiloxane comprising at least two cationic quaternary ammonium groups, wherein the cationic polyorganosiloxane is present in an amount in the range of from about 0.1% to about 10% by the combined weight of the non-aqueous fluid and the cationic polyorganosiloxane; and, wherein the cationic polyorganosiloxane comprises a compound represented by the following structure:

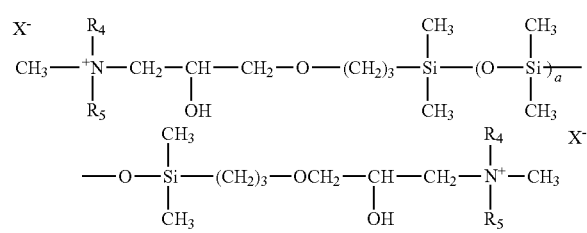

wherein $R_4$ is an hydroxyalkyl group, $R_5$ is an hydroxyalkyl group, a is an integer in the range of from 10 to 2,000, and $X^-$ is a compatible anion.

2. The treatment fluid of claim 1, wherein the non-aqueous fluid further comprises a hydrocarbon solvent.

3. The treatment fluid of claim 1, wherein the cationic polyorganosiloxane has a molecular weight in the range of from about 1,000 to about 150,000.

4. The treatment fluid of claim 1 further comprising water.

5. The treatment fluid of claim 1 wherein the cationic polyorganosiloxane is present in an amount in the range of from about 0.5% to about 5% by the combined weight of the non-aqueous fluid and the cationic polyorganosiloxane.

6. A treatment fluid for treating a subterranean formation to improve gas production therefrom, the treatment fluid comprising:

a non-aqueous fluid comprising an oxygenated solvent; and
a cationic polyorganosiloxane comprising at least two cationic quaternary ammonium groups, wherein the cationic polyorganosiloxane is present in an amount in the range of from about 0.1% to about 10% by the combined weight of the non-aqueous fluid and the cationic polyorganosiloxane; and, wherein the cationic polyorganosiloxane comprises a compound represented by the following structure:

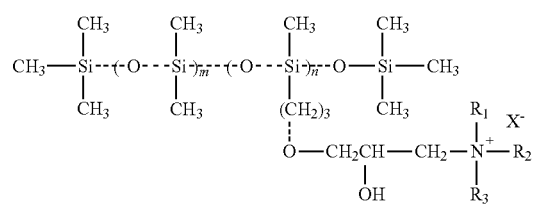

wherein $R_1$ is a hydroxyalkyl group, $R_2$ is a hydroxyalkyl group, $R_3$ is a methyl group, n is an integer in the range of from 2 to 150, m is an integer in the range of from 20 to 2,000, and $X^-$ is a compatible anion.

7. The treatment fluid of claim 6, wherein the non-aqueous fluid further comprises a hydrocarbon solvent.

8. The treatment fluid of claim 6, wherein the cationic polyorganosiloxane has a molecular weight in the range of from about 1,000 to about 150,000.

9. The treatment fluid of claim 6 further comprising water.

10. The treatment fluid of claim 6 wherein the cationic polyorganosiloxane is present in an amount in the range of from about 0.5% to about 5% by the combined weight of the non-aqueous fluid and the cationic polyorganosiloxane.

11. A treatment fluid for treating a subterranean formation to improve gas production therefrom, the treatment fluid comprising:

a non-aqueous fluid comprising an oxygenated solvent;
a cationic polyorganosiloxane comprising at least two cationic quaternary ammonium groups, wherein the cationic polyorganosiloxane is present in an amount in the range of from about 0.1% to about 10% by the combined weight of the non-aqueous fluid and the cationic polyorganosiloxane; and, wherein the cationic polyorganosiloxane comprises a compound represented by the following structure:

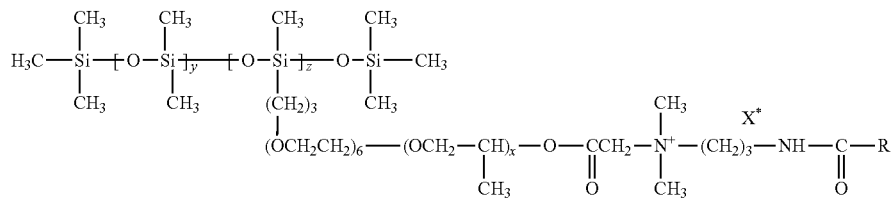

wherein R is an hydroxyalkyl group, x is an integer in the range from 2 to 150, y is an integer in the range of from 10 to 2,000, z is an integer in the range of from 10 to 2,000, and $X^-$ is a compatible anion; and, a second cationic polyorganosiloxane selected from the group consisting of:
a compound represented by the following structure:

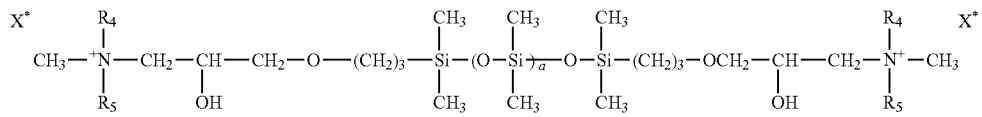

wherein $R_4$ is a hydroxyalkyl group, $R_5$ is a hydroxyalkyl group, a is an integer in the range of from 10 to 2,000, and $X^-$ is a compatible anion; and, a compound represented by the following structure:

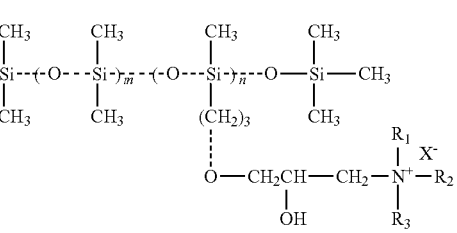

wherein $R_1$ is a hydroxyalkyl group, $R_2$ is a hydroxyalkyl group, $R_3$ is a methyl group, n is an integer in the range of from 2 to 150, m is an integer in the range of from 20 to 2,000, and $X^-$ is a compatible anion.

12. The treatment fluid of claim 11, wherein the non-aqueous fluid further comprises a hydrocarbon solvent.

13. The treatment fluid of claim 11, wherein the cationic polyorganosiloxane has a molecular weight in the range of from about 1,000 to about 150,000.

14. The treatment fluid of claim 1 further comprising water.

15. The treatment fluid of claim 11 wherein the cationic polyorganosiloxane is present in an amount in the range of from about 0.5% to about 5% by the combined weight of the non-aqueous fluid and the cationic polyorganosiloxane.

* * * * *